United States Patent
Lu et al.

(10) Patent No.: US 12,436,520 B2
(45) Date of Patent: Oct. 7, 2025

(54) METHOD AND SYSTEM OF THREE-DIMENSIONAL PRINTING TO PREPARE SURFACE FOR GRIPPING OF SUBSEQUENT LAYERS

(71) Applicant: INTERNATIONAL BUSINESS MACHINES CORPORATION, Armonk, NY (US)

(72) Inventors: Fang Lu, Billerica, MA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 18/045,900

(22) Filed: Oct. 12, 2022

(65) Prior Publication Data
US 2024/0126233 A1  Apr. 18, 2024

(51) Int. Cl.
*G05B 19/4099* (2006.01)

(52) U.S. Cl.
CPC ............. *G05B 19/4099* (2013.01); *G05B 2219/49023* (2013.01)

(58) Field of Classification Search
CPC ...... G05B 19/4099; G05B 2219/49023; B29C 64/118; B29C 64/194; B29C 64/393;
(Continued)

(56) References Cited

U.S. PATENT DOCUMENTS 9,339,972 B2    5/2016  Gordon
9,724,876 B2    8/2017  Cheverton
(Continued)

FOREIGN PATENT DOCUMENTS

CN    110696361 B    1/2020
CN    113977935 A    1/2022
CN    215512287 U    1/2022

OTHER PUBLICATIONS

3D Printing Market by Offering (Printer, Material, Software, Service), Process (Binder Jetting, Direct Energy Deposition, Material Extrusion, Material Jetting, Powder Bed Fusion), Application, Vertical, Technology, and Geography (2021-2026). https://www.marketsandmarkets.com/Market-Reports/3d-printing-market-1276.html. Retrieved from the internet on Aug. 29, 2022.

A. M. Abdelhay et al., "Ultrasonic Evaluation of Surface Roughness Using Normal Incidence Pulse - Echo Technique" NDT.net • Apr. 2004 • vol. 9 No. 04 https://www.ndt.net/article/v09n04/abdelh1/abdelh1.htm.

(Continued)

*Primary Examiner* — Alicia M. Choi
(74) *Attorney, Agent, or Firm* — Kimberly Zillig

(57) ABSTRACT

A system for layer-by-layer three-dimensional (3D) printing of a 3D printed object. The system includes a printing component configured to print a plurality of layers to form the 3D printed object, a surface modification component configured to be co-operable with the printing component and configured to apply an appropriate degree of surface roughness to at least one of the plurality of layers after being printed, and a controller configured to identify parameters of each of the at least one of the plurality of layers and configured to control operation of the printing component and the surface modification component, wherein the parameters include the appropriate degree of surface roughness.

20 Claims, 5 Drawing Sheets

(58) Field of Classification Search
CPC ..... B29C 64/106; B29C 64/112; B33Y 10/00; B33Y 30/00; B33Y 50/02
See application file for complete search history.

(56) References Cited

U.S. PATENT DOCUMENTS

| | | | |
|---|---|---|---|
| 10,449,696 B2 | 10/2019 | Elgar | |
| 11,241,841 B1 | 2/2022 | Susnjara | |
| 2004/0164436 A1* | 8/2004 | Khoshnevis | B29C 64/106 425/463 |
| 2017/0008080 A1* | 1/2017 | Xu | B22C 9/061 |
| 2017/0312985 A1* | 11/2017 | Talgorn | B29C 64/118 |
| 2018/0071989 A1* | 3/2018 | Zenou | B29C 64/106 |
| 2018/0162046 A1* | 6/2018 | Budge | B33Y 10/00 |
| 2019/0299536 A1* | 10/2019 | Putman | B22F 10/20 |
| 2019/0329502 A1* | 10/2019 | Tobia | B22F 10/40 |
| 2020/0130056 A1* | 4/2020 | Geisen | B22F 10/366 |
| 2020/0247063 A1* | 8/2020 | Pinskiy | G06F 18/2411 |
| 2020/0282594 A1 | 9/2020 | Ladewig | |
| 2020/0310366 A1* | 10/2020 | Tsumura | B33Y 50/02 |
| 2021/0178798 A1* | 6/2021 | Terzic | B41M 5/502 |
| 2023/0052299 A1* | 2/2023 | Gonzalez Martin | B22F 10/80 |

OTHER PUBLICATIONS

Arafath et al., "Additive Manufacturing with Compaction Rollers and Multinozzle 3D Printing," Sabic, KSA, IPCOM000266766D, IP.com, Aug. 18, 2021, 5 pages.

Fathom—Pushing the limits of advanced manufacturing by unlocking new insights from additive technologies. IBM.com. https://www.IBM.com/case-studies/fathom. Retrieved from the internet on Aug. 29, 2022.

Joachim Stumpfe. (2019) "Digital platform for industrial 3D printing." IBM.com https://www.ibm.com/blogs/blockchain/2019/04/digital-platform-for-industrial-3d-printing/ <Retrieved from the internet on Aug. 29, 2022>.

Philipp Schume (2020) Improve product quality and yield with intelligent, secure, and adaptable manufacturing operations—IBM Business Operations Blog. https://www.IBM.com/blogs/internet-of-things/iot-manufacturing-ready/. Retrieved from the internet on 29-Aug. 2022.

What is Industry 4.0 and how does it work? https://www.ibm.com/topics/industry-4-0. Retrieved from internet on Aug. 29, 2022.

* cited by examiner

METHOD AND SYSTEM OF THREE-DIMENSIONAL PRINTING TO PREPARE SURFACE FOR GRIPPING OF SUBSEQUENT LAYERS

BACKGROUND

The present disclosure relates generally to three-dimensional (3D) printing, and more specifically, to a method and system of 3D printing in which surface roughness is introduced during printing to one or more layers in order to prepare an upper surface of the one or more layers for gripping of subsequent layers of a 3D printed object.

A 3D printing process, also known as additive manufacturing, builds a 3D printed object from a computer-aided design (CAD) model, usually by successfully adding material layer-by-layer. The layers can each be cured, for example, via exposure to UV light, solidifying them into solid material matching the CAD model.

SUMMARY

According to some embodiments of the disclosure, there is provided a system for layer-by-layer three-dimensional (3D) printing of a 3D printed object. The system includes a printing component configured to print a plurality of layers to form the 3D printed object. The system also includes a surface modification component configured to be co-operable with the printing component and configured to apply an appropriate degree of surface roughness to at least one of the plurality of layers after being printed. The system further includes a controller configured to identify parameters of each of the at least one of the plurality of layers and configured to control operation of the printing component and the surface modification component, wherein the parameters include the appropriate degree of surface roughness. The appropriate degree of surface roughness applied to the at least one of the plurality of layers provides an appropriate amount of gripping strength between the at least one of the plurality of layers and a consecutively printed layer of the plurality of layers.

According to some embodiments of the disclosure, there is provided a method of layer-by-layer three-dimensional (3D) printing. The method includes: selecting parameters for an object to be printed; printing a first layer of the object based on the parameters; detecting physical features of the first layer including a first surface roughness of the first layer; updating the parameters based on the detected physical features of the first layer; and, carrying out a surfacing step on the first layer. The surfacing step includes: determining, based on the parameters and the detected physical features, whether the first layer has an appropriate surface roughness; and, adjusting the first surface roughness of the first layer in response to determining that the first layer does not have the appropriate surface roughness. The method further includes: printing a second layer of the object based on the updated parameters; detecting physical features of the second layer including a second surface roughness of the second layer; updating the parameters based on the detected physical features of the second layer; and, carrying out the surfacing step on the second layer.

According to some embodiments of the disclosure, there is provided a method of layer-by-layer three-dimensional (3D) printing. The method includes: providing a 3D printer, wherein the 3D printer includes a print head; selecting parameters for an object to be printed; providing a surface modification assembly, wherein the surface modification assembly operates co-operatively with a print head of the 3D printer; printing a first layer of the object based on the parameters; detecting physical features of the first layer including a first surface roughness of the first layer; updating the parameters based on the detected physical features of the first layer; and, carrying out a surfacing step on the first layer. The surfacing step includes: determining, based on the parameters and the detected physical features, whether the first layer has an appropriate surface roughness; and, providing surface roughness to the first layer using the surface modification assembly in response to determining that the first layer does not have the appropriate surface roughness. The method further includes: printing a second layer of the object based on the updated parameters; detecting physical features of the second layer including a second surface roughness of the second layer; updating the parameters based on the detected physical features of the second layer; and carrying out the surfacing step on the second layer.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
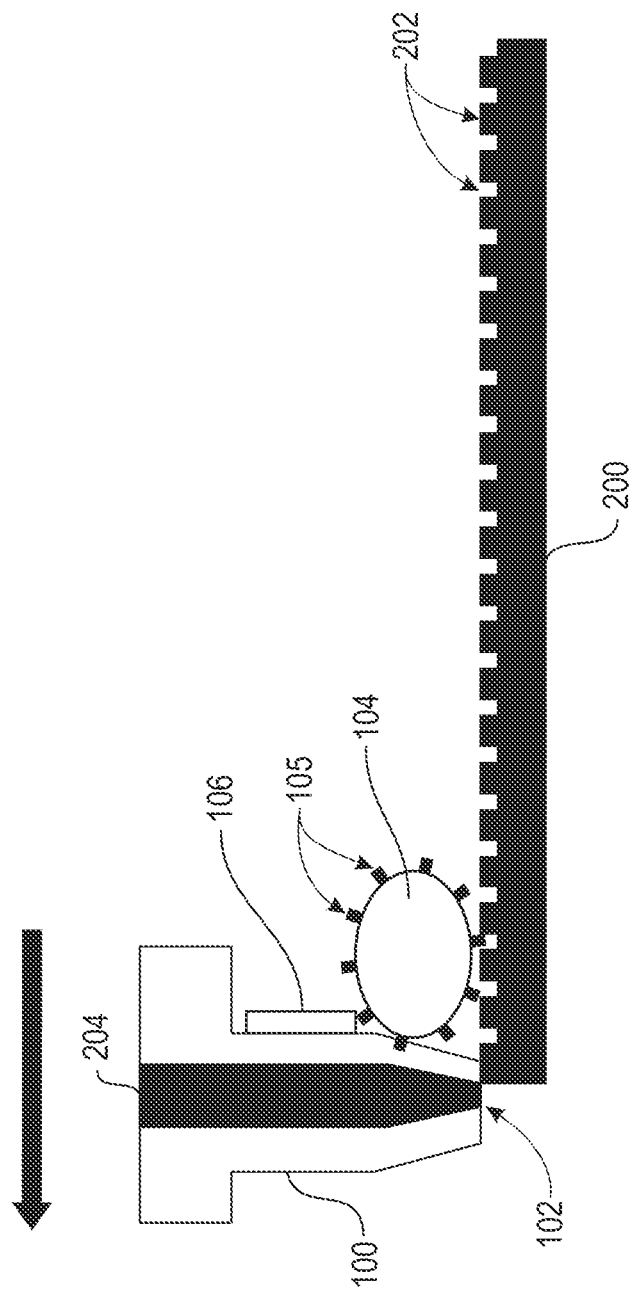
FIG. 1 is a side, cross-sectional view of a 3D print head shown printing a layer of material, according to some embodiments of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to three-dimensional (3D) printing, and more specifically, to a method and system of 3D printing in which surface roughness is introduced during printing to one or more layers in order to prepare an upper surface of the one or more layers for gripping of subsequent layers of a 3D printed object.

Disclosed is a method and system by which, while performing layer-by-layer 3D printing, a 3D printer can dynamically create an appropriate level of surface roughness on a layer such that bonding strength between the layer and a consecutively printed layer can be increased. The appropriate level of surface roughness can be dynamically created on the layer taking into consideration, for example, an amount of time required to create the subsequent layer; an amount of time required for solidification of the layer; and a relative position of the layer with respect to a resultant 3D printed object, etc.

While printing layers during 3D printing, bonding strengths between printed layers can be important. Without sufficient bonding strength, a microcrack in a resultant 3D printed object can result. For example, as solidification times for two adjacent printed layers can be different (such as if the two layers are made of a different material), a microcrack can result. An advantage of the disclosed methods and systems is that bonding strength between two adjacent layers can be increased by introducing surface roughness, such that stronger 3D printed objects can be created. Another advantage of the disclosed methods and systems is that additional steps to bond layers, such as applying glue, etc., will not be required, which reduces material costs and production time of 3D printed objects.

FIG. 1 is a side, cross-sectional view of a 3D print head 100 shown printing a layer 200 of material with surface roughness 202, according to some embodiments of the disclosure. The print head 100 is a movable dispensing print head provided with a supply of material 204 delivered through an opening 102 in the print head 100. The supply of material 204 can be a plastic filament, for example, such as about 3 mm in diameter, and fed through the print head 100. Before being fed through the print head 100, the filament can pass over a heating mechanism (not shown). The layer 200 that results from the filament material can then solidify at a predetermined temperature. 3D printed objects can be produced by depositing repeated layers of solidifying material until a desired shape is formed.

FIG. 1 is one example of a print system that can provide surface modification that includes the print head 100; a print head follower assembly 104 (example shown includes a rotating or rolling barrel with a notched surface) co-operable with the print head 100 and operable for modifying at least a portion of a surface of a 3D printed object printed by the print head 100, and a computing apparatus (not shown) operable for controlling operation of the print system. The computing apparatus, or controller, can use 3D printer information, such as parameters of each of the at least one of a plurality of layers. The controller can be configured to control the operation of the printer (such as a printing component and a surface modification component, see FIG. 4). As shown, the print head follower assembly 104 (e.g., the rotating barrel shown) can be attached via an attachment mechanism 106 to the print head 100. The print head follower assembly 104 shown is one example of a mechanism capable of creating surface roughness or texture on layer 200. As the layer 200 is printed and the print head 100 moves in the direction of the arrow, the print head follower assembly 104, including its notches 105, which can extend from an outer surface of the print head follower assembly 104, can roll or move along and contact the top (or upper surface of) of the layer 200 after it is laid or printed and before it has solidified, which creates surface roughness or texture 202 on/in the layer 200. An advantage of the surface roughness or texture 202 is to provide a gripping mechanism for the next layer (not shown) laid or printed atop the layer 200. Other methods and components that can be used to introduce surface roughness are contemplated, such as different types and shapes of notches 105, etc., on the outer surface of the print head follower assembly 104.

The material used in 3D printers or systems, as described above, can comprise one or more plastic materials, such as thermoplastics, and particularly acrylonitrile butadiene styrene (ABS). Other thermoplastics which can be used, include nylon, polystyrene and polylactic acid (PLA). Other suitable materials are also contemplated.

Figure 2:
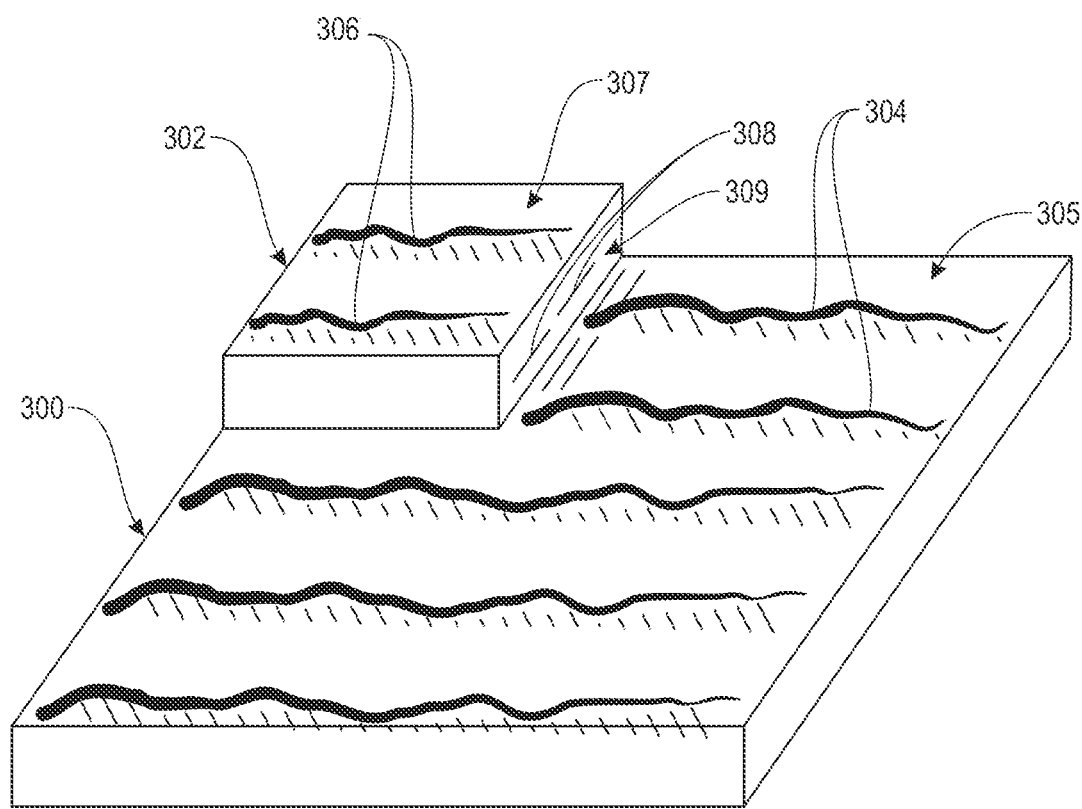
FIG. 2 is a perspective view of a first printed layer and a second printed layer including surface roughness, according to some embodiments of the disclosure.

FIG. 2 is a perspective view of portions of a first printed layer 300 and a second printed layer 302, both including surface roughness, according to some embodiments of the disclosure. The first printed layer 300 shown was printed before the second printed layer 302. Surface roughness 304 is present atop, or on an upper surface 305 of, the first printed layer 300. There is surface roughness 306 shown atop, on an upper surface 307 of, the second printed layer 302, and surface roughness 308 on a side surface 309 of the second printed layer 302. The figure illustrates portions of only two layers printed by a 3D printer. A plurality of layers being printed with surface roughness are contemplated in order to form a 3D printed object with increased gripping strength between the layers.

Figure 3:
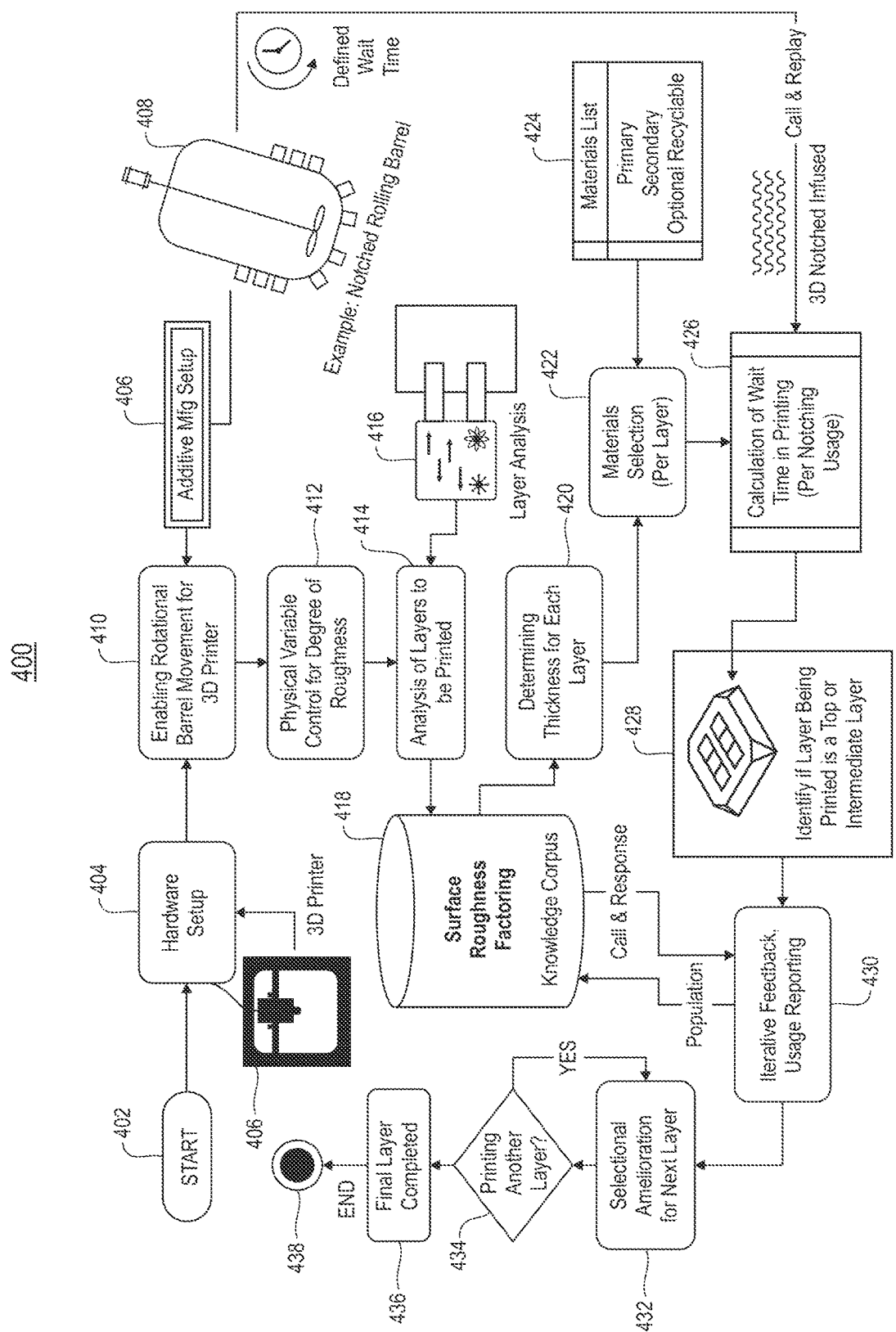
FIG. 3 is a flow chart of a method of 3D printing including introduction of surface roughness to one or more layers, according to some embodiments of the disclosure.

FIG. 3 is a flow chart of a system 400 of 3D printing including introduction of surface roughness to one or more layers of a 3D printed object, according to some embodiments of the disclosure. The system 400 has a start block 402. A next operation after the start block 402 can be hardware setup 404 of a 3D printer 406. An additive manufacturing setup (not shown) can also be included in the system 400 and associated with the 3D printer 406. The 3D printer 406 can also include a surface roughness module, for example (not shown). An example notched rolling barrel (or print head follower assembly) 408 can be attached near a 3D print head in the 3D printer 406, which can introduce surface roughness to layers after they are printed (see FIG. 1). The hardware setup 404 and the additive manufacturing setup (not shown) can enable rotational movement of the notched rolling barrel 408, for example, in the 3D printer (block 410), and can also provide physical variable control for a degree of surface roughness introduced to an upper layer being printed, which can be varied by relative adjustment of the notched rolling barrel (or print head follower assembly) (block 412).

While a 3D printed object is being printed, the system 400 can analyze a number of layers that are required to complete the 3D printed object (block 414), using a component or layer analysis software 416, or a combination of both, that can perform the layer analysis. The system 400 can include a knowledge corpus 418, which can identify, for example, a degree of surface roughness of layers, a gripping strength between two consecutively printed layers, etc. (otherwise referred to as "surface roughness factoring"). As surface roughness is created on an upper surface of a layer as it is printed, the system 400 can advantageously create a strong bond between the layer and a consecutively printed layer.

Block 420 includes a step of determining a thickness of each oriented layer. The thickness and width of each layer can be calculated based on a final dimension of the 3D printed object, and based on the number of layers required for completing the 3D printed object. The system 400 also can include a step of materials selection (per layer) 422. The material can be selected based upon the time required for solidification of the material in each layer. A list of materials 424 can be provided in the system 400, and the list of materials 424 can include primary materials, secondary materials, optional materials and recyclable materials, for example. Based on the final dimensions of a 3D printed object, the system 400, at block 426 can also identify a calculation of a waiting time in printing (per notching usage)

each consecutive layer at a same position, as the 3D print head rotates around the 3D printed object.

Based on historical data captured during 3D printing, the system 400 can identify a degree and an angle of surface roughness to create on each layer. The degree of roughness can be created on layers in order to meet a required level of gripping strength between consecutively printed layers. The degree of roughness can be created by adjusting the notched rolling barrel 408, for example, with respect to the 3D print head. While 3D printing is being performed, the system 400 can identify if the layer being printed is a top layer or an intermediate layer (block 428). Based on a position of the layer being printed, the system 400 can identify if any side of the layer will be covered by another layer and, accordingly, if sidewise surface roughness creation is desired.

As shown in FIG. 3, iterative feedback and usage reporting (block 430) can be called and the knowledge corpus 418 can be populated with a feedback and usage report, which can include data about the layers being printed, etc. The system 400 can also use the knowledge corpus 418 to find out how the surface roughness is to be created for 3D printing, and, accordingly, the same can be controlled dynamically. Block 432 indicates amelioration for selection(s) of a next layer over time. Block 434 indicates a query as to whether another layer is to be printed or not. Once a final layer is printed, no surface roughness or texture is required on the final, or top, layer. Accordingly, the notched rolling barrel 408 can be changed in its position adjacent the 3D print head to not contact a newly printed layer. After the upper, or final, layer is printed, the system of printing the 3D printed object is ended (block 438).

The system 400 can include an ultrasound scanning module (not shown). The ultrasound scanning module can allow for ultrasound scanning of surface roughness of layers of the 3D printed object. Feedback from the ultrasound scanning module can be used by the knowledge corpus 418, for example.

Figure 4:
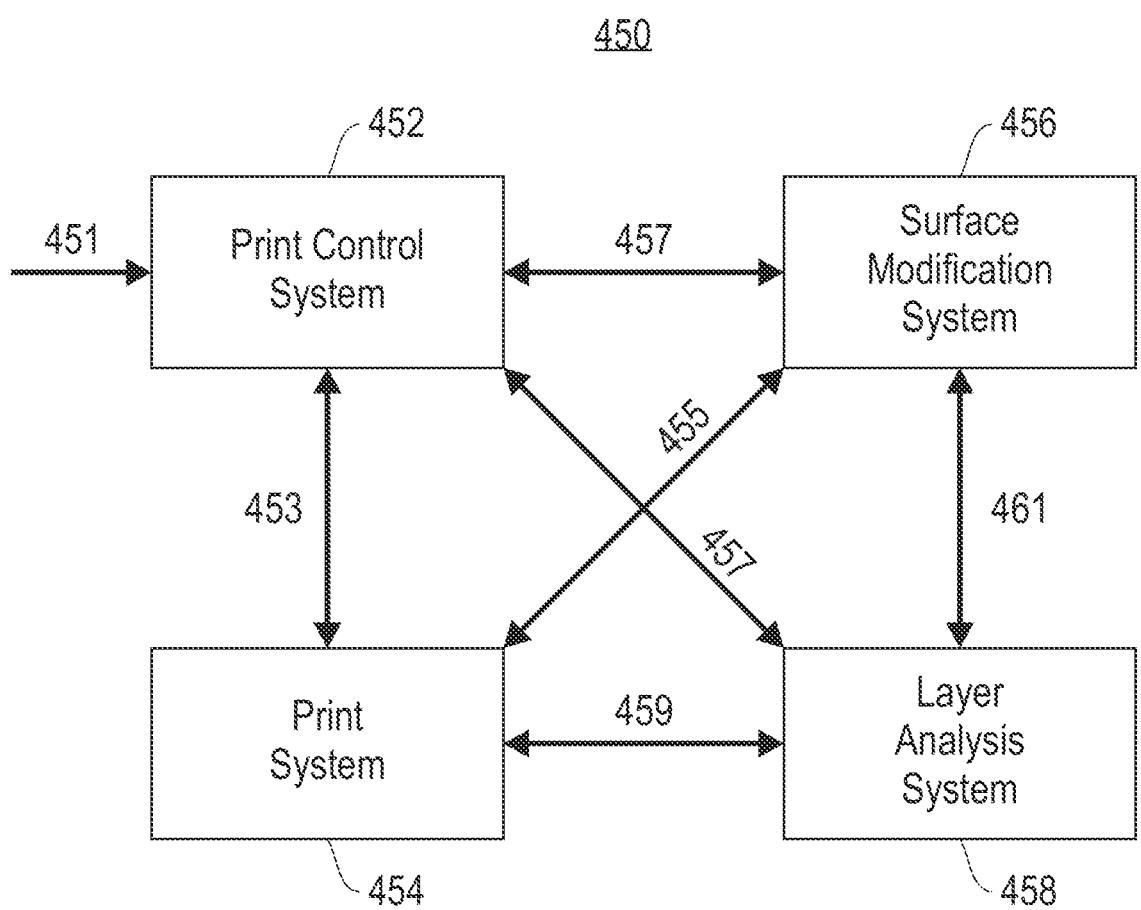
FIG. 4 is a block diagram of a system of layer-by-layer 3D printing including introduction of surface roughness to one or more layers, according to some embodiments of the disclosure.

FIG. 4 illustrates a block diagram of a system 450 of layer-by-layer 3D printing including introduction of surface roughness to one or more layers, according to some embodiments of the disclosure. The system 450 can include a print control system 452 that can execute one or more programs that monitor, store and control operating parameters, conditions and states to accomplish various tasks, such as printing (manufacturing) a particular 3D printed object. Information 451 can be provided or inputted to the print control system 452 and can include, for example, a digital model of an object to be created or a series of movement and control commands to print the 3D printed object.

The print control system 452 can be coupled to a print system 454, a surface modification system 456, and a layer analysis system 458. The print system 454 can comprise a printer that responds to commands (e.g., communications 453) provided by print control system 452. Commands or instructions can cause the print system 454 to move one or more print heads (e.g., print head 100 in FIG. 1) in one or more axes during construction of a 3D printed object. Commands or instructions can provide Cartesian coordinates and/or change (delta) from current positions. Commands or instructions can also cause material to be fed into one or more print heads. In an example, one or more stepper motors can push material through one or more deposition heads in a friction feed. A friction feed is a method of feeding paper through a printer. Friction-feed printers can use plastic or rubber rollers to squeeze a sheet of paper and pull it through the printer. Commands or instructions can also cause the print system 454 to heat material to an appropriate temperature so that it exits the print head (e.g., print head 100 in FIG. 1) with appropriate properties. In an example, the print head (e.g., print head 100 in FIG. 1) can be heated to melt material at a specific temperature using a resistive heater and a temperature sensor, e.g., a thermistor. The print system 454 can communicate data (represented by arrow 453) to the print control system 452, such as, deposition head positioning data, material deposition data, environmental parameters and/or data regarding sensing of various parameters, conditions and states.

The surface modification system 456 can be coupled to the print control system 452 and the print system 454. The surface modification system 456 can receive various parameters, conditions, states, commands/instructions in the form of information or signals. The data received by the surface modification system 456 includes, for example, surface texture of each layer printed as it is printed, etc. The surface modification system 456 is configured to use data 455 communicated by the print system 454 and can feed information 457 back and forth with the print control system 452, to control a print head follower assembly (e.g., rotating barrel or print head follower assembly 104 in FIG. 1), for example, connected to the print head (e.g., print head 100 in FIG. 1), in order to cause texture to be added to a newly printed layer.

The layer analysis system 458 can be coupled to the print control system 452, the print system 454, and the surface modification system 456. The layer analysis system 458 can receive various parameters, conditions, states, commands/ instructions in the form of information or signals. The data or communication 451, 459 and 461 received by the layer analysis system 458 from the print control system 452, the print system 454 and the surface modification system 456, respectively, can include, for example, deposition/print state (e.g., velocity, direction, temperature), material properties and states, sensor inputs, layer thickness, etc. The layer analysis system 458 can communicate back with the print control system 452, the print system 454 and the surface modification system 456, as needed. Information utilized by the layer analysis system 458 can include a list of possible materials for the layers (e.g., a materials list 424 in FIG. 3). Material can be a fixed or a default value. For example, the print control system 452 can be configured for a particular type of material. Velocity and direction may change dynamically during printing. Information can be provided directly by the print control system 452 and/or the print system 454.

Figure 5:
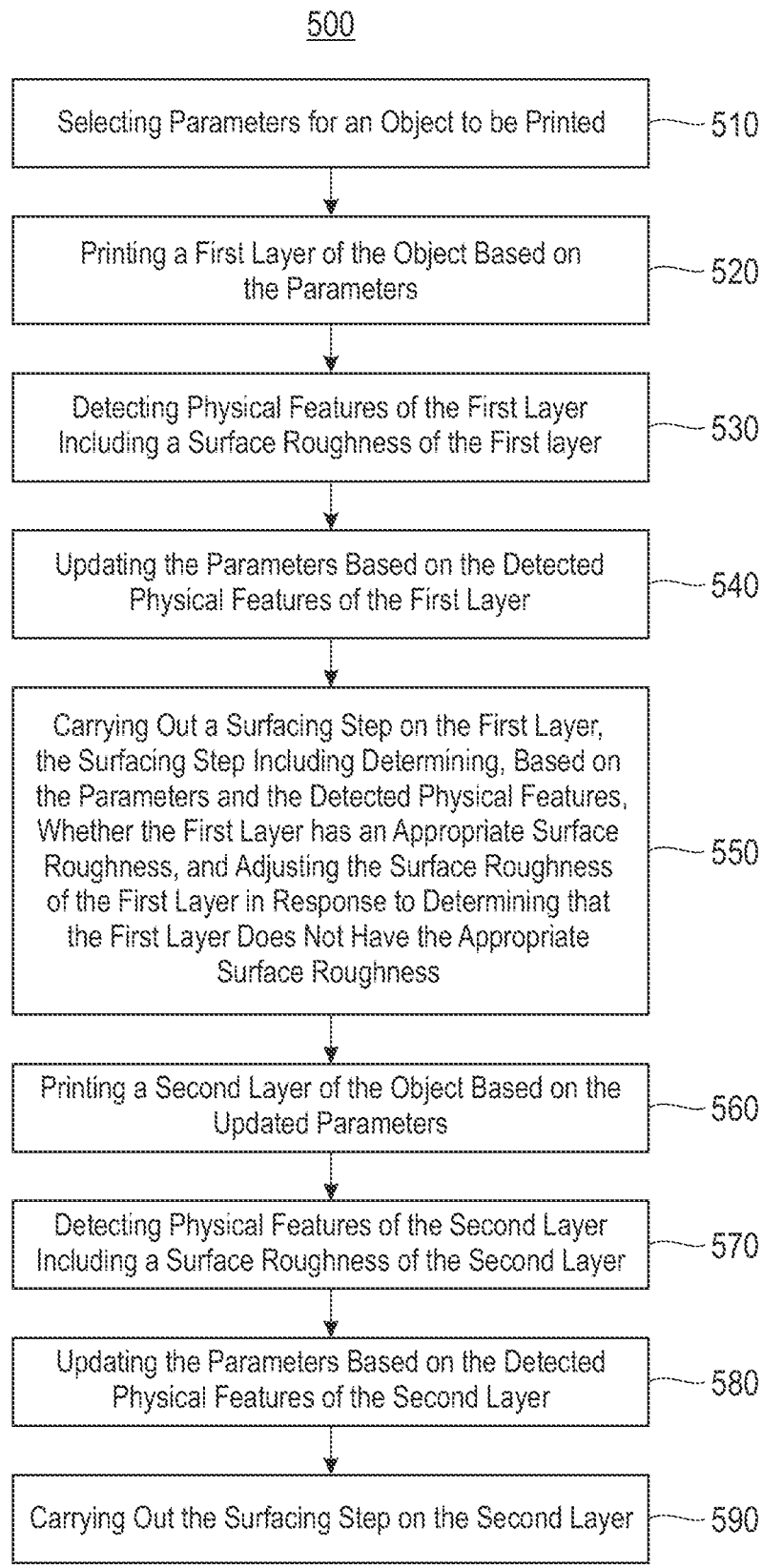
FIG. 5 is a flow chart of a method of layer-by-layer 3D printing, according to some embodiments of the disclosure.

FIG. 5 is a flow chart of a method of layer-by-layer 3D printing 500, according to some embodiments of the disclosure. An operation of the method 500 can be selecting parameters for an object to be printed (block 510). The parameters can include, for example, suitable materials used for the object, dimensions of the object, shape of the object, number of layers needed to form the object, amount of gripping strength desired between layers of the object, etc. Another operation of the method 500 can include printing a first layer of the object based on the parameters (block 520). An additional operation of the method 500 can include detecting physical features of the first layer including a first surface roughness of the first layer (block 530). A further operation can be updating the parameters based on the detected physical features of the first layer (block 540). Yet a further operation can include carrying out a surfacing step on the first layer, the surfacing step including determining, based on the parameters and the detected physical features, whether the first layer has an appropriate surface roughness, and adjusting the first surface roughness in response to determining that the first layer does not have the appropriate surface roughness (block 550). Another operation can include printing a second layer of the object based on the updated parameters (block 560). A further operation can include detecting physical features of the second layer including a second surface roughness of the second layer (block 570). Anther operation can include updating the parameters based on the detected physical features of the second layer (block 580). A further operation can include carrying out the surfacing step on the second layer (block 590). The method 500 can further include repeating the printing, the detecting, the updating, and the surfacing steps to form a plurality of layers of the object.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and sub-combinations with one another. The methods and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

"3D printer" is defined as "a machine used for 3D printing" and "3D printing" is defined as "the fabrication of objects through the deposition of a material using a printer (or print) head, nozzle, or another printer technology."

Synonyms associated with and encompassed by 3D printing include additive fabrication, additive processes, additive techniques, additive layer manufacturing, layer manufacturing, and freeform fabrication. "Additive manufacturing (AM)" is defined as "a process of joining materials to make objects from 3D model data, usually layer upon layer, as opposed to subtractive manufacturing methodologies. Additive manufacturing (AM) may also be referred to as rapid prototyping (RP). As used herein, "3D printing" is generally interchangeable with "additive manufacturing" and vice versa.

"Printing" is defined as depositing of a material using a print head, nozzle, or another printer technology.

In this disclosure, "3D or three dimensional article, object or part" means an article, object or part obtained by additive manufacturing or 3D printing as disclosed above.

In this disclosure, the term "3D printing" covers a variety of processes in which material is joined or solidified under computer control to create a 3D object. Material is added together (such as liquid molecules or powder grains being fused together) such as layer-by-layer.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program can be converted into a standard tessellation language (STL) file format; however other file formats can also or additionally be used. The file is generally read into 3D printing software, which takes the file and optionally user input to separate it into hundreds, thousands, or even millions of "slices." The 3D printing software can output machine instructions, which may be in the form of G-code, which is read by the 3D printer to build each slice. The machine instructions are transferred to the 3D printer, which then builds the object, layer-by-layer, based on this slice information in the form of machine instructions. Thicknesses of these slices may vary.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for layer-by-layer three-dimensional (3D) printing of a 3D printed object, the system comprising:
    a print head configured to print a plurality of layers to form the 3D printed object;
    a print head follower assembly configured to be co-operable with the print head and configured to apply a degree of surface roughness to at least one of the plurality of layers after being printed and before the at least one of the plurality of layers solidifies; and
    a controller configured to identify parameters of each of the at least one of the plurality of layers and configured to control operation of the print head and the print head follower assembly, wherein the parameters include the degree of surface roughness,
    wherein the degree of surface roughness applied to the at least one of the plurality of layers provides an amount of gripping strength between the at least one of the plurality of layers and a consecutively printed layer of the plurality of layers.

2. The system of claim 1, wherein the surface roughness is introduced on an upper surface of the at least one of the plurality of layers.

3. The system of claim 1, wherein the surface roughness is introduced on a side surface of the at least one of the plurality of layers.

4. The system of claim 1, wherein the print head includes a rotating barrel with notches extending from an outer surface of the rotating barrel.

5. The system of claim 1, wherein the parameters further include a thickness of each of the at least one of the plurality of layers.

6. The system of claim 1, wherein the parameters further include a relative position of each of the at least one layer of the plurality of layers with respect to a dimension of the 3D printed object.

7. The system of claim 1, wherein the parameters further include a material of each of the at least one of the plurality of layers.

8. A method of layer-by-layer three-dimensional (3D) printing, the method comprising:
- selecting parameters for an object to be printed;
- printing a first layer of the object based on the parameters;
- detecting physical features of the first layer including a first surface roughness of the first layer;
- updating the parameters based on the detected physical features of the first layer;
- carrying out a surfacing step on the first layer, the surfacing step including
  - determining, based on the parameters and the detected physical features, whether the first layer has a desired surface roughness, and
  - changing the first surface roughness of the first layer to a second surface roughness of the first layer by using a print head follower assembly configured to be co-operable with a print head and configured to apply a degree of surface roughness to the first layer after being printed and before the first layer solidifies in response to determining that the first layer does not have the desired surface roughness;
- printing a second layer of the object based on the updated parameters using the print head;
- detecting physical features of the second layer including a first surface roughness of the second layer;
- updating the parameters based on the detected physical features of the second layer; and
- introducing a second surface roughness on the second layer using the print head follower assembly configured to apply a degree of surface roughness to the second layer after being printed and before the second layer solidifies.

9. The method of claim 8, further comprising:
repeating the printing step, the detecting step, the updating step, and the surfacing step to form a plurality of layers of the object.

10. The method of claim 9, wherein the parameters further include a material of each of the at least one of the plurality of layers.

11. The method of claim 8, wherein the first surface roughness of the first layer is introduced on an upper surface of the first layer.

12. The method of claim 8, wherein a third surface roughness is introduced on a side surface of at least one of the first layer and the second layer.

13. The method of claim 8, wherein the parameters further include a thickness of each of the first layer and the second layer.

14. The method of claim 8, wherein the parameters further include a relative position of each of the first layer and the second layer with respect to a dimension of the object.

15. A method of layer-by-layer three-dimensional (3D) printing, the method comprising:
- providing a 3D printer, wherein the 3D printer includes a print head;
- selecting parameters for an object to be printed;
- providing a print head follower assembly, wherein the print head follower assembly operates co-operatively with the print head of the 3D printer, wherein the print head follower assembly is configured to apply a degree of surface roughness to a layer after being printed and before the layer solidifies;
- printing a first layer of the object based on the parameters;
- detecting physical features of the first layer including a first surface roughness of the first layer;
- updating the parameters based on the detected physical features of the first layer;
- carrying out a surfacing step on the first layer, the surfacing step including
  - determining, based on the parameters and the detected physical features, whether the first layer has a desired surface roughness, and
  - updating the parameters to adjust a surface roughness of a second layer in response to determining that the first layer does not have the desired surface roughness;
- printing the second layer of the object based on the updated parameters;
- detecting physical features of the second layer including the surface roughness of the second layer;
- updating the parameters based on the detected physical features of the second layer; and
- introducing a second surface roughness on the second layer using the print head follower assembly.

16. The method of claim 15, further comprising:
repeating the printing step, the detecting step, the updating step, and the surfacing step to form a plurality of layers of the object.

17. The method of claim 15, wherein the first surface roughness of the first layer is introduced on an upper surface of the first layer.

18. The method of claim 15, wherein a third surface roughness is introduced on a side surface of at least one of the first layer and the second layer.

19. The method of claim 15, wherein the parameters further include a thickness of each of the first layer and the second layer.

20. The method of claim 15, wherein the parameters further include a relative position of each the first layer and the second layer with respect to a dimension of the object.

* * * * *